United States Patent [19]

Yoshida et al.

[11] Patent Number: 4,918,551
[45] Date of Patent: Apr. 17, 1990

[54] APPARATUS FOR LOADING A RECORD MEDIUM CASSETTE

[75] Inventors: Shuji Yoshida, Saitama; Eiji Ohshima, Tokyo; Yoshio Kusui, Kanagawa, all of Japan

[73] Assignee: Sony Corporation, Tokyo, Japan

[21] Appl. No.: 214,827

[22] Filed: Jul. 5, 1988

Related U.S. Application Data

[63] Continuation-in-part of Ser. No. 867,223, May 27, 1986, abandoned.

[30] Foreign Application Priority Data

May 27, 1985 [JP] Japan .................................. 60-113782
May 27, 1985 [JP] Japan ............................. 60-78895[U]

[51] Int. Cl.⁴ ............................................. G11B 15/66
[52] U.S. Cl. ..................................... 360/96.5; 360/85; 360/95
[58] Field of Search ....................... 360/96.6, 96.5, 84, 360/85, 95

[56] References Cited

U.S. PATENT DOCUMENTS

| 4,017,900 | 2/1977 | Katsurayana ........................ 360/137 |
| 4,453,188 | 6/1984 | Johnson et al. ................... 360/98 X |
| 4,635,150 | 1/1987 | Kato et al. .......................... 360/92 X |
| 4,639,797 | 1/1987 | Kobayashi et al. ............... 360/85 X |
| 4,654,727 | 3/1987 | Blum et al. ......................... 360/92 X |
| 4,680,654 | 7/1987 | Shibuya .............................. 360/96.5 |

FOREIGN PATENT DOCUMENTS

| 2552577 | 1/1985 | France . |
| 56-80844 | 7/1981 | Japan ................................. 360/96.6 |
| 59-171070 | 9/1984 | Japan .................................... 360/95 |
| 60-85460 | 5/1985 | Japan ................................ 360/96.5 |
| 1162082 | 8/1969 | United Kingdom . |

Primary Examiner—John H. Wolff
Attorney, Agent, or Firm—Hill, Van Santen, Steadman & Simpson

[57] ABSTRACT

A cassette compartment of a compact type recorder or player comprises an outer cassette holder and an inner cassette holder. The cassette is moved from a popped-up position to a set position and then to a loading position. The cassette is inserted at the popped-up position into the inner holder which is set down to the set position together with the outer holder. The inner holder is then moved straightforward to carry the cassette at the loading position. The inner holder is interlocked with the outer holder which is spring-urged to the popped-up position and is releasably locked at the set position.

7 Claims, 10 Drawing Sheets

APPARATUS FOR LOADING A RECORD MEDIUM CASSETTE

This is a continuation of application Ser. No. 867,223, filed May 27, 1986, now abandoned.

BACKGROUND OF THE INVENTION

1. Field of the Invention

The present invention relates to a loading apparatus for a cassette containing a record medium and, more particularly, to a tape cassette loading apparatus for a video tape recorder.

2. Description of the Prior Art

A slidable loading mechanism for loading a cassette containing a magnetic tape or a magnetic disk sheet in a video or audio recorder is known. In this mechanism, a cassette compartment is arranged on a slidable chassis, and a record medium is loaded to a predetermined recording/reproducing position upon sliding movement thereof. In a portable recorder, an outer cover of a cassette compartment, i.e., the outer surface of a cassette pocket, is often part of an outer casing of the recorder in order to reduce the size of the recorder.

In the cassette loading apparatus with the above arrangement, the outer cover of the cassette compartment is movable together with the slidable chassis. Therefore, if the outer cover is pressed by, e.g., a hand, unnecessary external force is applied to the slidable mechanism, thus damaging part of the mechanism or degrading positioning precision of a cassette.

Further, a structure with an aperture undesirably formed between the outer cover of the cassette compartment and an outer casing of the recorder upon movement (loading or unloading) of the slidable chassis is to be avoided. This is because the internal mechanism of the recorder is exposed through such an aperture, and this leads to potential problems therewith.

A pop-up type cassette loading mechanism is also conventionally used. In this mechanism, a cassette holder (pocket) can pivot. The cassette holder pops up to expose a cassette insertion opening. After a cassette is inserted therein, the cassette holder is pushed down, thus completing the cassette loading operation.

Figure 1:
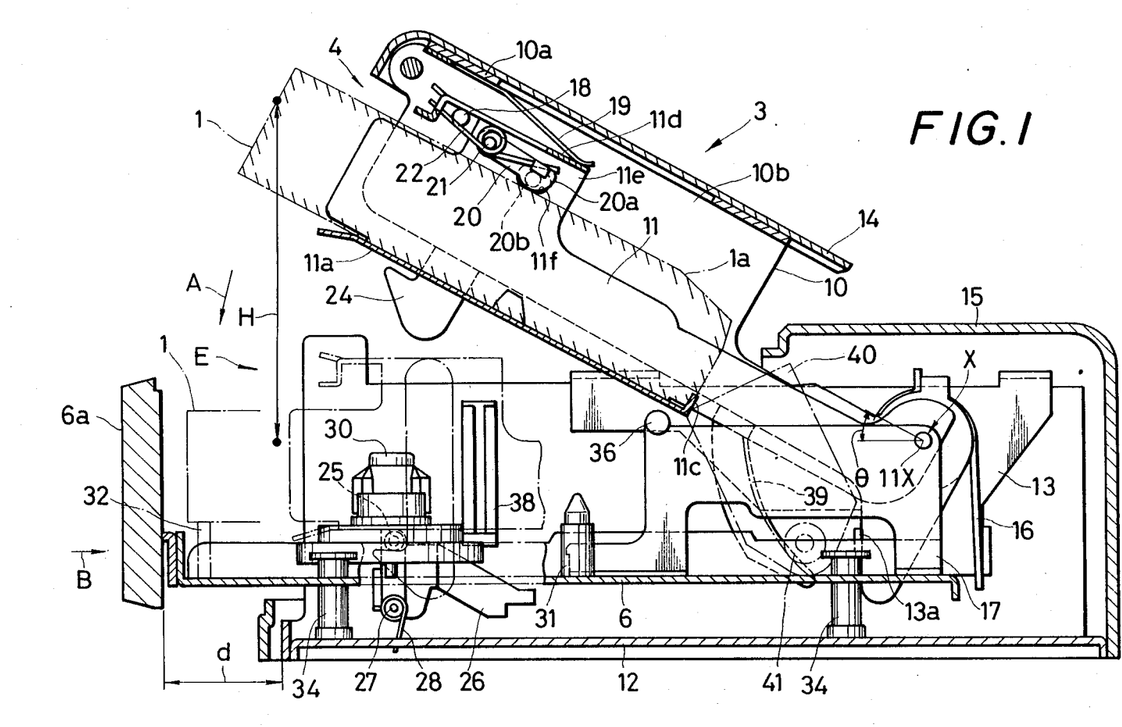
FIG. 1 is a sectional view of a video tape recorder adopting a cassette loading apparatus of the prevent invention, taken along a sliding loading direction of a tape cassette (before the cassette is loaded)

When the pop-up type cassette loading mechanism shown in FIG. 1 is adopted, a gap as wide as a hand is often formed between a pop-up cassette holder 10 and an outer casing of the recorder. This gap should be made as narrow as possible, but tends to be widened as the recorder becomes compact in size.

When the cassette holder is in the pop-up position shown in FIG. 1, a cassette positioning pin, a guide pin and the like on a cassette loading plane must be completely disengaged from the cassette. Therefore, as the width of the recorder is decreased, a pop-up angle $\theta$ of the cassette holder increases accordingly. For this reason, a pop-up height H increases upon increase in $\tan\theta$, and a gap E between the cassette holder 10 and the outer casing of the recorder increases. In this case, an unskilled operator may try to insert a cassette 1 through the gap E, and may thus damage the internal mechanism of the recorder.

In a recorder combining a pop-up type cassette holder and a slidable cassette loading mechanism, the gap E is further widened upon backward sliding of the slidable mechanism.

SUMMARY OF THE INVENTION

It is an object of the present invention to prevent an external force from being applied to a slidable mechanism even if the external force is applied to an outer cover of a cassette compartment.

It is another object of the present invention to prevent unnecessary exposure of an internal mechanism of a recorder or erroneous insertion of a cassette.

These and other objects and many of the attendant advantages of this invention will be readily appreciated as the same becomes better understood by reference to the following detailed description when considered in connection with the accompanying drawings.

DESCRIPTION OF THE PREFERRED EMBODIMENT

An embodiment of a VTR cassette loading apparatus to which the present invention is applied will now be described with reference to FIGS. 1 to 5.

A tape cassette 1 has a cassette cover 1a, which covers a front aperture of the cassette 1 and is automatically opened upon loading thereof. The cassette is aligned at a predetermined position with respect to a rotary head drum 2 by sliding movement (in a direction to which the front aperture of the cassette 1 faces; to be referred to as horizontal movement hereinafter), and a magnetic tape housed therein is thereby loaded.

Figure 2:
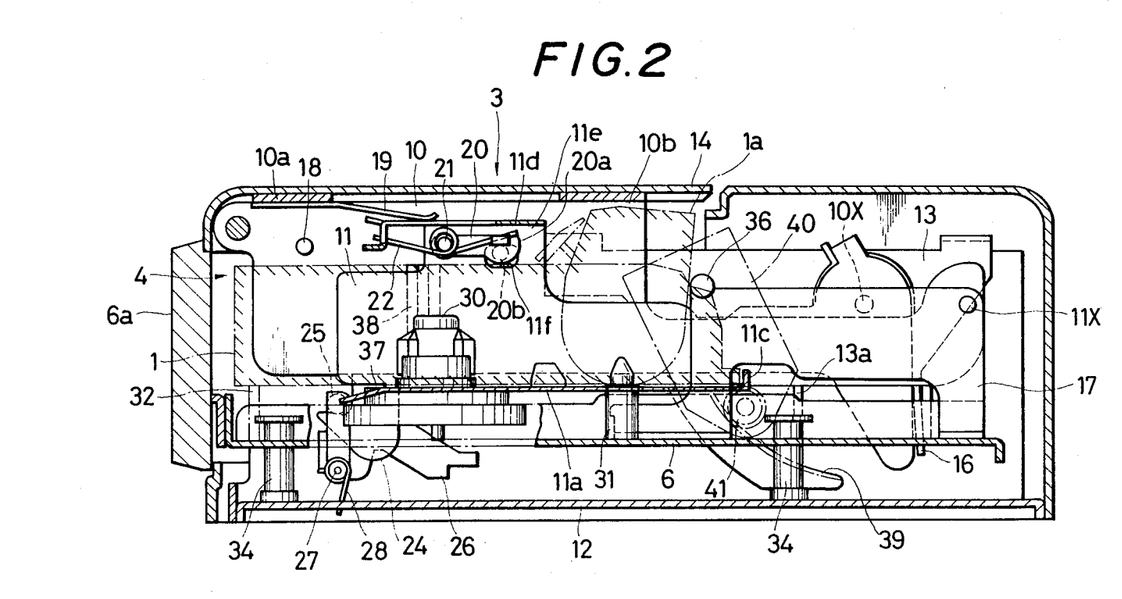
FIG. 2 is a sectional view of the apparatus after the cassette is loaded.

In this embodiment, a cassette compartment 3 can be pivoted about a fulcrum X from an open position (FIG. 1) to a closed position (FIG. 2). In the open position, an insertion aperture 4 is present at a pivotal end face of the cassette compartment 3, and the cassette 1 is inserted therein, as shown in FIG. 1. When the cassette compartment 3 is pressed toward the closed position, in a direction indicated by arrow A, a slidable mechanism is operated and the cassette 1 is moved forward upon horizontal movement of a slidable chassis 6, in a direction indicated by arrow B.

Figure 4:
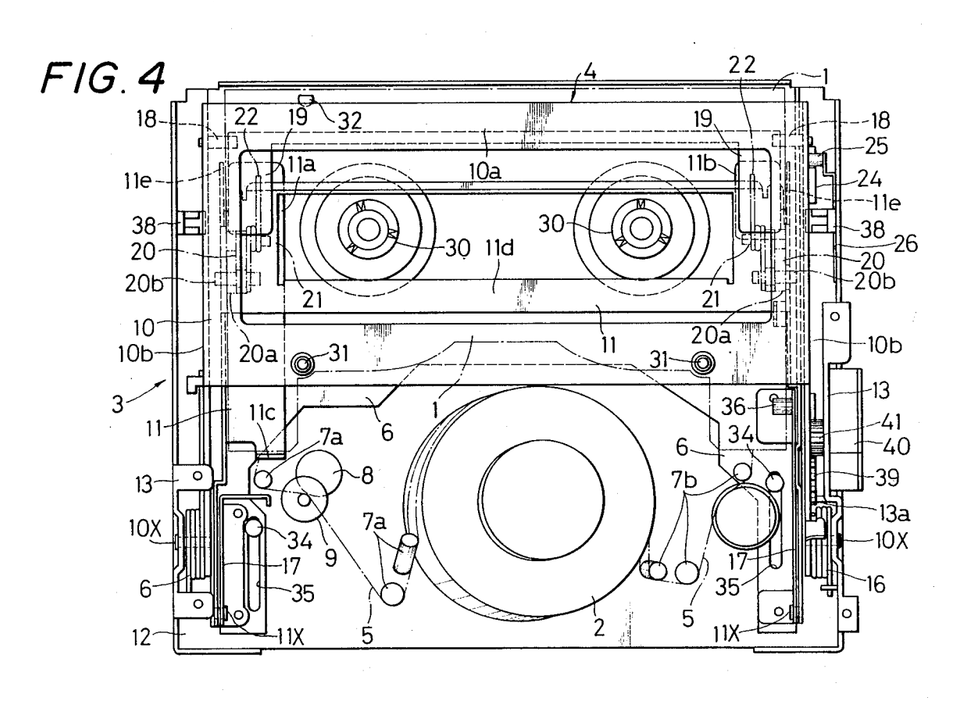

A magnetic tape 5, exposed at the front aperture of the cassette 1, is drawn therefrom by guide pins 7a and 7b upon sliding movement of the cassette 1, as shown in FIG. 4, and is wound around the rotary drum head 2. A pinch roller 8 is urged against a capstan 9 to sandwich the magnetic tape therebetween.

Since the cassette loading mechanism is slidable, the outer size of the VTR can be reduced by a moving distance d of the slidable chassis 6, as shown in FIG. 1.

The cassette compartment 3 has a double structure, consisting of outer and inner cassette holders 10 and 11. The outer cassette holder 10 is pivotally supported by a fixed portion of the VTR, and the inner cassette holder 11 is pivotally supported by the slidable chassis 6 and slides therewith.

Figure 5:
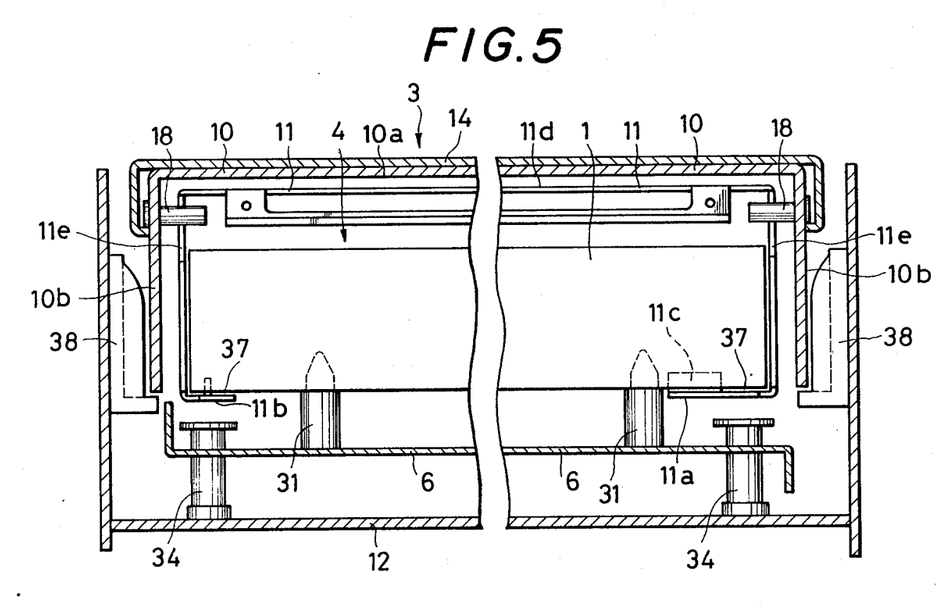
FIG. 5 is a cross-sectional view taken along a direction perpendicular to the sliding loading direction.

The outer cassette holder 10 has a channel-like cross-section, as shown in FIG. 5, and an upper surface comprising a cover plate (outer cover) 14 having a transparent window. Pivots 10X of the outer cassette holder 10 extend from side plates 13 fixed to a main frame 12, and coil springs 16 are wound around the pivots 10X to bias the cassette holder 10 in the open state shown in FIG. 1. An upper pivot end of the holder 10 is restricted by a bent portion 13a of one of the side plate 13.

The inner cassette holder 11 also has a channellike cross-section, as well as bent portions 11a and 11b at two side ends thereof, thus defining a substantially rectangular cassette housing space, as shown in FIG. 5. A bent portion 11c, as a stopper for the cassette 1 in its insertion direction, is formed at a front end of the inner cassette holder 11, so that the cassette 1 is inserted up to the bent portion 11c, as shown in FIG. 1.

Figure 3:
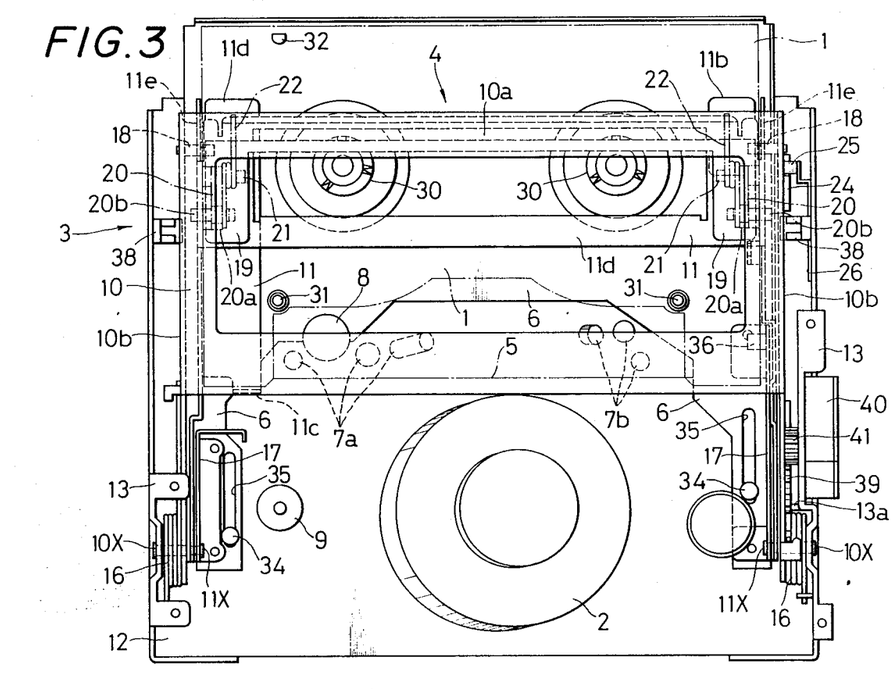
FIGS. 3 and 4 are plan views of a main part of the apparatus of FIG. 2.

Pivots 11X of the inner cassette holder 11 extend from side plates 17 fixed to the slidable chassis 6, as shown in FIG. 3. When the cassette compartment 3 is in the open position shown in FIG. 1, the pivots 10X and 11X of the outer and inner cassette holders 10 and 11 are coaxial with each other. In other words, the inner cassette holder 11 can be pivoted virtually coaxially with the outer cassette holder 10.

Engaging pins 18 extend from inner surfaces of two side surfaces 10b of the outer cassette holder 10, and are inserted below an upper plate 11d of the inner cassette holder 11. Therefore, the inner cassette holder 11 is interlocked with the outer cassette holder 10 in its pivoting direction, and is pivoted upon pivotal movement of the outer cassette holder 10.

However, the engaging pins 18 do not engage the inner cassette holder 11 in its sliding direction. Thus, as shown in FIG. 2, the inner cassette holder 11 can slide to a cassette loading position upon horizontal movement of the slidable chassis 6 during the cassette loading operation.

A pair of leaf springs 19, which act as urging members, are arranged on a lower surface of an upper plate 10a of the outer cassette holder 10 to bias the upper plate 11d of the inner cassette holder 11 toward the cassette. The engaging pins 18 act as pivot stoppers of the inner cassette holder 11 in its urged direction.

In addition, as shown in FIG. 1, a pair of pressing arms 20 are mounted on two side surfaces 11e of the inner cassette holder 11 to be biased by coil springs 22 wound around shafts 21. When the cassette 1 is inserted in the inner cassette holder 11, round pivot ends 20a of the arms 20 press the upper surface of the cassette 1 downward, thereby temporarily holding the cassette 1 in the holder. Note that projections 20b extend from the pivot ends 20a of the arms 20 through holes 11f formed in the side surfaces 11e of the cassette holder 11, and act as pivot limiters of the arms 20.

When the cassette compartment 3 housing the cassette 1 is pressed downward, a lock pawl 24 mounted on the side surface of the outer cassette holder 10 is engaged with a lock roller 25 arranged on the side surface of the main frame 12, thus holding the cassette compartment 3 in a horizontal position, as indicated by alternate long and dashed lines in FIG. 1. The lock roller 25 is mounted on a pivoting free end of a lock lever 26, and is biased in an engaging direction by a coil spring 28 wound around a pivot shaft 27 of the lever 26.

After the pawl 24 is engaged with the lock roller 25, a limit switch (not shown) engaged with the lock lever 26 is operated to energize a motor (not shown) for moving the slidable chassis 6. Although not shown, a sliding movement mechanism may comprise a cam mechanism or a rack & pinion mechanism provided between the slidable chassis 6 and the main frame 12. The slidable chassis 6 is slidably guided by guide pins 34 extending from the main frame 12 and guide holes 35 formed in the slidable chassis 6.

Upon completion of the sliding movement, the tape cassette 1 is moved forward to a position shown in FIGS. 2 and 4, and the loading operation of the magnetic tape 5 is preformed as previously described.

When the cassette compartment 3 is pressed downward from the open state of FIG. 1, the cassette cover 1a is opened by a cover push-up pin 36 extending from the upper end of the side plate 17 of the slidable chassis 6, as shown in FIG. 2. The magnetic tape 5 is thus exposed at the front aperture of the cassette 1 to be drawn therefrom for the loading operation.

When the cassette compartment 3 is pressed downward, reel drive shafts 30 extending from the slidable chassis 6 are inserted in a pair of reel holes of the tape cassette 1. A pair of positioning pins 31 mounted on the slidable chassis 6 are inserted in reference holes formed in the bottom surface of the tape cassette 1, thereby accurately positioning the cassette 1 in its vertical and horizontal directions. In addition, a pair of height restricting pins 32 extend from rear ends of the slidable chassis 6, so that the distal ends thereof abut against the bottom surface of the cassette 1 to restrict the height thereof.

When the tape cassette 1 is loaded in the horizontal position at a predetermined reference level, the bottom surface thereof is separated from the lowermost bent portions 11a, 11b of the inner cassette holder 11 by a small gap 37, as shown in FIG. 2 or 5. Therefore, the inner cassette holder 11 does not interfere with positioning of the cassette 1 in the vertical direction.

The inner cassette holder 11 is pressed by the leaf springs 19 of the outer cassette holder 10 into contact with the upper surface of the slidable chassis 6. The cassette 1 is pressed against reference end faces of the positioning pins 31 and the height restricting pins 32 by the pivotal ends 20a of the pressing arms 20, as previously described. The separation amount of the cassette 1 from the bent portions 11a, 11b corresponds to an upward movement pivot ends 20a of the pressing arms 20.

When the cassette compartment 3 is pressed downward and the cassette 1 is held at the horizontal position, as described above, the outer and inner cassette holders 10 and 11 have no restricting force with respect to the cassette 1, except the biasing force of the springs. Therefore, the cassette 1 is moved forward to the tape loading position upon horizontal movement of the slidable chassis 6. As previously described, the inner cassette holder 11 is horizontally moved with the slidable chassis 6. However, since the outer cassette holder 10 is fixed in the horizontal direction, the leaf springs 19 slide along the upper surface 11d of the inner cassette holder 11, and the relative positions of the cassette holders 10 and 11 are thus changed.

When an external force is applied on the cover plate 14 of the cassette compartment 3 in the loading completion state shown in FIG. 2, and the outer cassette holder 10 is displaced below its locked position, this displacement is absorbed by flexure of the leaf springs 19, and the extenal force will not be transmitted to the inner cassette holder 11, the cassette 1, or the slidable chassis 6. Therefore, damage to the slidable mechanism or degradation in positioning precision of the cassette 1 due to deformation of the positioning mechanism can be prevented. Even if the cover plate 14 is pressed by a hand during the loading operation, return movement of the slidable chassis 6 can be performed without any problem.

When an external force is applied to the cover plate 14 of the outer cassette holder 10, its displacement is restricted such that distal ends of the two side surfaces 10b abut against a pair of stoppers 38 mounted on the side surfaces of the main frame 12, as shown in FIG. 5. Therefore, the holder 10 is no longer displaced.

An unloading (cassette eject) operation is performed in a reverse manner to the loading operation described above. First, the slidable chassis 6 is moved backward, and the lock lever 26 is pivoted by a backward-moving end thereof, thus disengaging the lock roller 25 from the lock pawl 24. Then, the outer cassette holder 10 is urged upward by the biasing force of the coil springs 16 to the position shown in FIG. 1. The inner cassette holder 11 is then moved upward and pivoted by the engaging pins 18 together with the outer cassette 10.

A rack gear 39 having an axis corresponding to the pivots 10X is mounted on one side surface of the outer cassette holder 10. The rack gear 39 is meshed with a gear 41 of a damper 40 to apply a braking force which allows the cassette compartment 3 to slowly pivot upward.

Figure 6A:
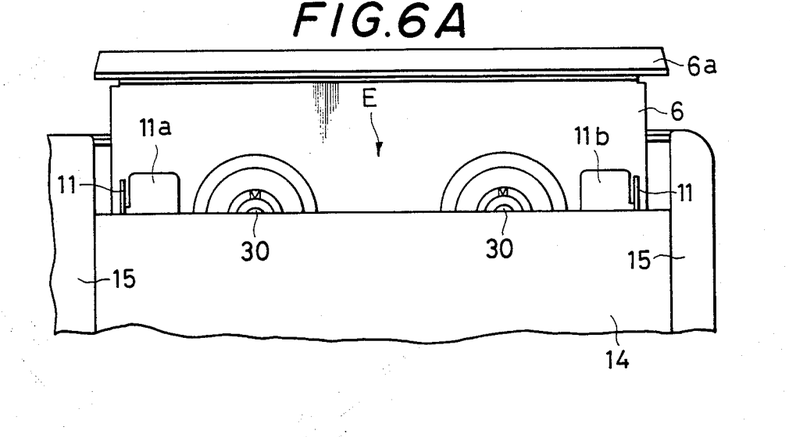
FIG. 6A is a plan view of a main part of the video tape recorder.
Figure 6B:
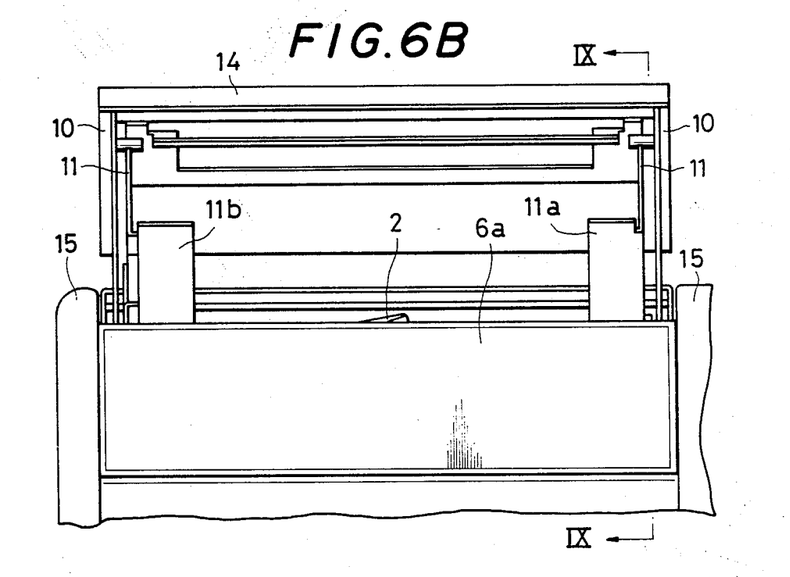
FIG. 6B is a front view of the main part of the recorder.

Since the cassette compartment 3 pivots about the pivot X as described above, when it is at the position shown in FIG. 1, an aperture portion E of an outer casing 15 is widened, as shown in FIGS. 1, 6A, and 6B when it is viewed from the side, above, and front, respectively.

Therefore, a countermeasure for preventing erroneous insertion of the cassette 1 into the aperture portion E is necessary.

Figure 7:
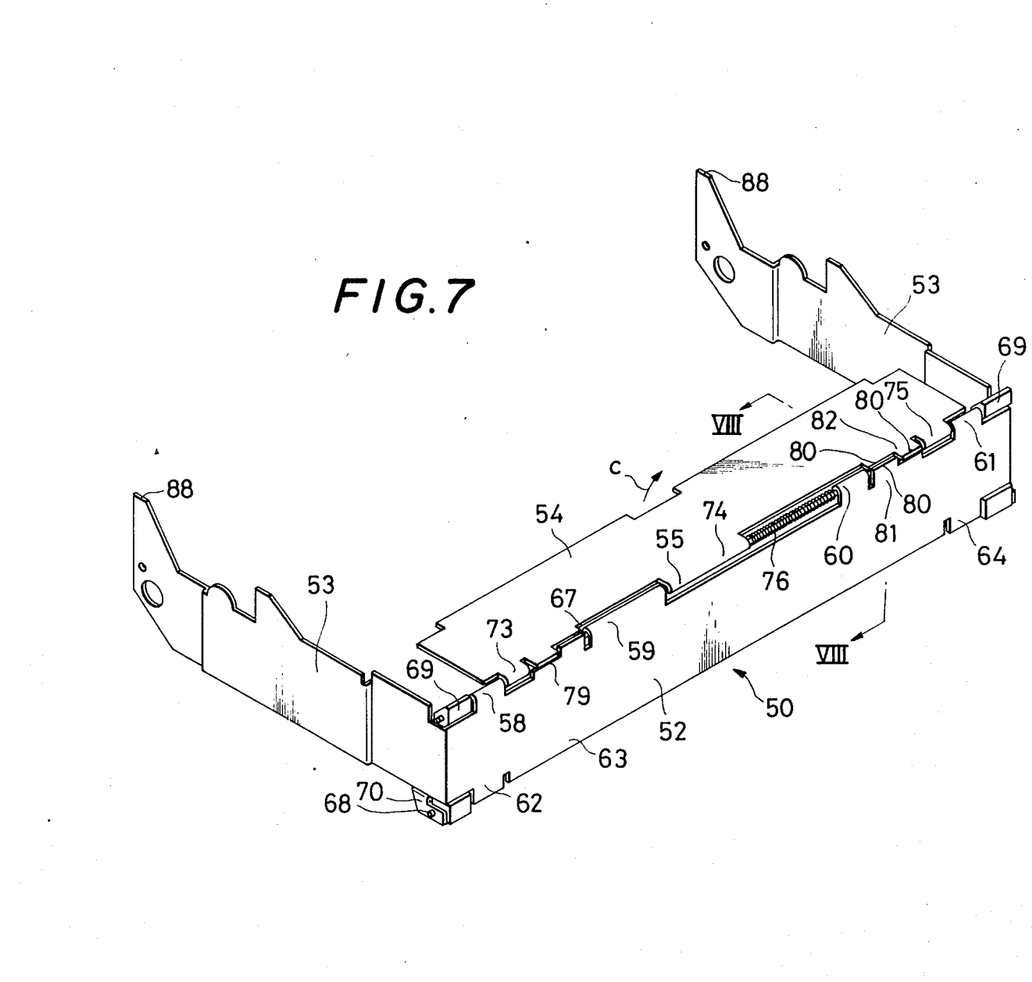
FIG. 7 is a perspective view of a concealing plate.

A concealing plate 50 is provided to conceal the aperture portion E, as shown in FIG. 7. An elongated thin plate is bent to provide a channel-like cross-section, so that its web portion acts as a front concealing portion 52, and flange portions act as a pair of side concealing portions 53. In addition, a rectangular plate is mounted on an upper end of the front concealing portion 52 through a hinge 55 to serve as an upper concealing portion 54.

Four bearings 58, 59, 60, and 61 are formed by bending the upper edge portion of the front concealing portion 52, and three bearings 62, 63, and 64 are formed by bending the lower edge portions thereof. Shaft members 67 and 68 extend through these upper and lower bearings, respectively.

Members 69 having a channel-like cross-section are fitted to two edge portions of the front concealing portion 52, so that their web portions are in surface contact with the rear surface of the portion 52. The shaft members 67 and 68 extend through upper and lower portions of the members 69. End portions of the shaft members 68 are received by brackets 70 extending from lower edges of the side concealing portions 53.

The hinge 55 is constituted such that the shaft member 67 is inserted alternately through the bearings 58 to 61 of the front concealing portion 52 and three separated bearings 73, 74, and 75 formed by bending a front edge portion of the upper concealing portion 54. A return spring 76 is wound around a portion of the shaft member 67 between the bearing 74 of the upper concealing portion 54 and the bearing 60 of the front concealing portion 53, and spring ends thereof abut against the bearings 74 and 60 for biasing the upper concealing portion 54 to pivot in a direction indicated by arrow C in FIG. 7 (i.e., upward).

A pair of stopper mechanisms 79 and 80, each consisting of a pair of projections, are formed between the bearing 73 of the upper concealng portion 54 and the bearing 59 of the front concealing portion 52, and between the bearing 60 of the front concealing portion 52 and the bearing 75 of the upper concealing portion 54, respectively, so as to set an open angle $\alpha$ (see FIG. 8) a substantially right angle between the front and upper concealing portions 52 and 54 by the biasing force of the return spring 76.

Figure 8:
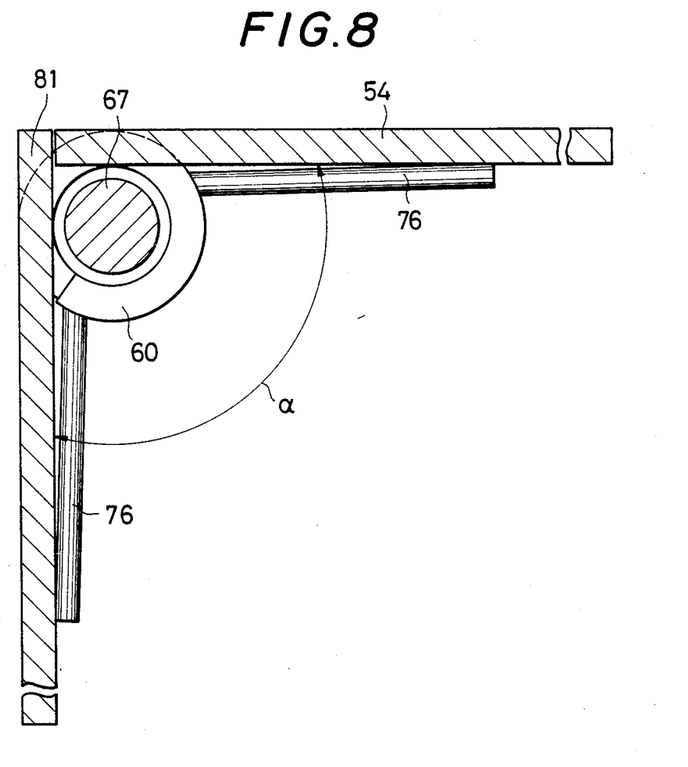
FIG. 8 is a sectional view taken along a line VIII—VIII in FIG. 7.

More specifically, a left stopper 80a of the right stopper mechanism 80 in FIG. 7 will be exemplified with reference to FIG. 8. When the open angle $\alpha$ between the front and upper concealing portions 52 and 54 is a right angle, an end face of the upper concealing portion 54 abuts against a side surface of a projection 81 extending from the front concealing portion 52, thus preventing the angle $\alpha$ from being increased.

Similarly for a right stopper 80b of the stopper mechanism 80, since a projection 82 extends from the upper concealing portion 54, an end face of the front concealing plate 52 abuts against the side surface of the projection 82, thus preventing the angle $\alpha$ from being increased.

Figure 9:
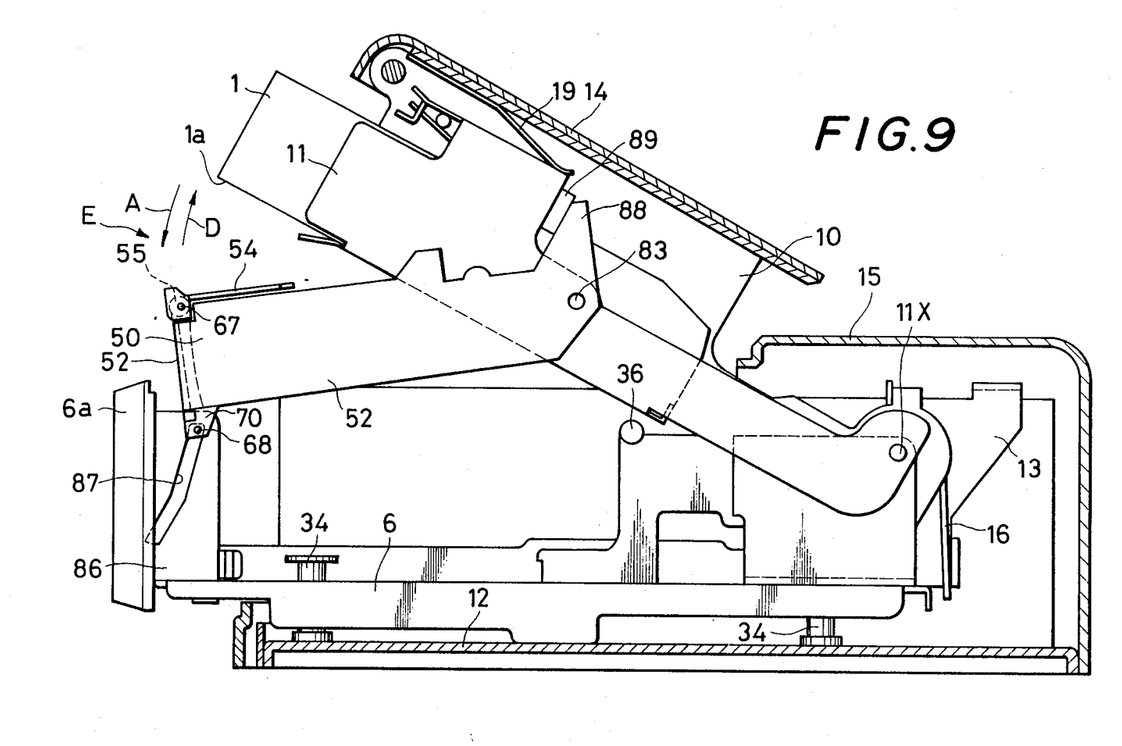
FIG. 9 is a sectional view taken along a line IX—IX in FIG. 6B.

The concealing plate 50 with the above structure is coupled to the inner cassette holder 11 at proximal end portions of the side concealing portions 53 through pins 83, as shown in FIG. 9. Oblique guide holes 87, which are slightly angled upward at their intermediate portions, are formed in frames 86 extending from two front side edge portions of the slidable chassis 6, and the end portions of the shaft member 68 are movably inserted in the guide holes 87.

The above mechanism is a slider-crank linkage in which the slidable chassis 6, part of the inner cassette holder 11, and the side concealing portion 53 of the concealing plate 50 are used as a link. When the inner cassette holder 11 reaches the position shown in FIG. 2, a sum of lengths of the part of the inner cassette holder 11 and the side concealing portion 53 of the concealing plate 50 corresponds to a length of the slidable chassis 6, which is substantially equal to that between the pivots 11X and the front end 1b of the tape cassette 1 when the cassette 1 is inserted in the inner cassette holder 11.

Since the tape cassette loading apparatus of this invention has the arrangement described above, when the cassette compartment 3 reaches the position shown in FIG. 9, side portions of the aperture portion E shown in FIG. 6A are concealed by the side concealing portions 53 of the concealing plate 50, and a front portion of the aperture portion E shown in FIG. 6A is concealed by the front concealing portion 52 of the plate 50.

Therefore, the interior of the VTR casing is not unnecessarily exposed. Due to the presence of the upper concealing portion 54, the tape cassette 1 will not be erroneously inserted in the aperture portion E. Stoppers are formed at the proximal end portions of the side concealing portions 53. The stoppers 88 abut against projections 89 of the inner cassette holder 11, which defines a cross angle of the concealing plate 50 with respect to the inner cassette holder 11.

In the position shown in FIG. 9, the tape cassette 1 is inserted in the inner cassette holder 11. When the holder 11 begins to pivot about the pivots 11X in the direction indicated by arrow A, the concealing plate 50 also begins to pivot clockwise about the pins 83, and the lower front end thereof begins to move downward while being guided along the guide holes 87 by the shaft member 68.

When the concealing plate 50 is moved to a certain extent, a front end face 1b of the bottom surface of the tape cassette 1 abuts against the upper concealing portion 54 of the concealing plate 50, and pivots the portion 54 clockwise against the biasing force of the return spring 76. In this case, since the front concealing portion 52 of the concealing plate 50 is inclined in the direction shown in FIG. 9, the front end face 1b of the cassette 1 can be easily housed behind the rear surface of the front concealing portion 52, without being blocked.

Figure 10:
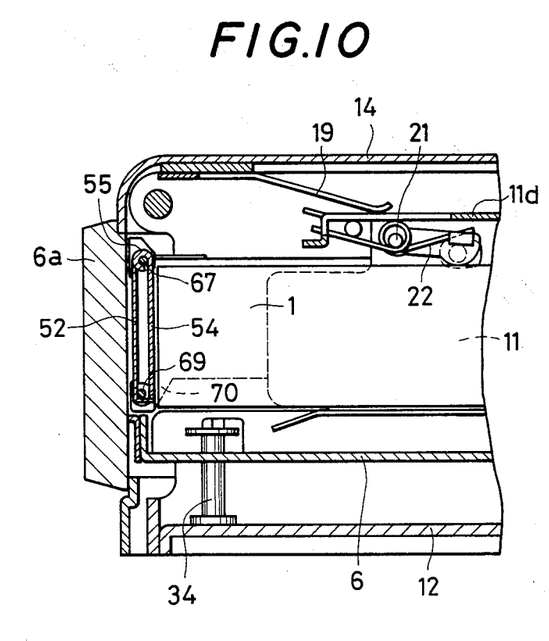
FIG. 10 is a side-sectional view of the recorder when the tape cassette is loaded.

After the tape cassette 1 is loaded in the VTR, the concealng plate 50 is folded and housed in the outer casing 15, as shown in FIG. 10. More specifically, the concealing plate 50 is housed in a gap between a front cover 6a of the slidable chassis 6 and the tape cassette 1, so that the front and upper concealing portions 52 and 54 overlay each other. The end portions of the shaft member 68 are located at the lower ends of the guide holes 87.

When the cassette compartment 3 pivots from the position shown in FIG. 2 to that in FIG. 9 in order to eject the tape cassette 1, the concealing plate 50 is operated in a reverse manner to that described above.

The concealing plate 50 pivots counterclockwise about the pins 83 upon pivoting movement of the inner cassette holder 11, from the position shown in FIG. 2 in a direction indicated by arrow D in FIG. 9, and the shaft member 68 is guided along the guide holes 87 to move upward. The upper concealing portion 54 of the concealing plate 50 is gradually released from the front end face 1b of the tape cassette 1, and is pivoted counterclockwise by a biasing force of the return spring 76.

The aperture portion E, which is gradually extended upon pivoting movement of the inner cassette holder 11, is thus concealed by the concealing plate 50, and finally presents the state shown in FIG. 9, as previously described.

According to the present invention as described above, a cassette holder has a double-structure, and an outer holder is movable with respect to a fixed portion of a recorder, and an inner holder is movable with respect to a slidable portion. Even if the outer cassette holder is exposed as part of an outer casing of the recorder, an external force applied thereto cannot be transmitted to the inner cassette holder, a tape cassette, or the slidable portion. Therefore, damage to the slidable mechanism and degradation in cassette position precision can be prevented, and high-performance can be maintained for a long period of time. A total size of the VTR can be rendered compact and thin due to a sliding loading operation. In addition, since the outer cassette holder is not slidable, a gap (aperture) communicating with the interior of the VTR is not formed in a portion of the outer casing upon cassette loading. In this way, a compact, portable recorder can be provided.

With the above arrangement of the present invention, when the cassette holder is popped up, an aperture portion formed upon movement thereof can be sufficiently concealed by a concealing plate. Therefore, the interior of the VTR is not unnecessarily exposed, and damage thereto caused by erroneous insertion of a tape cassette can be prevented.

Although the invention has been described with respect to preferred embodiments, it is not to be so limited as changes and modifications can be made which are within the full intended scope of the invention as defined by the appended claims.

We claim as our invention:

1. An apparatus for recording and/or reproducing a signal on a magnetic tape in a cassette tape:
   said apparatus having an outer casing which defines an aperture in a side thereof for use in loading and unloading a cassette into and from the apparatus through the aperture;
   tape cassette receiving means for receiving and holding a cassette, said receiving means being pivotally connected to said apparatus and constructed for pivotal movement through said aperture between a substantially-flush closed position and an angularly disposed open position;
   said cassette receiving means including a first holder pivotally connected to said apparatus and a second holder adapted to hold a cassette which is pivotally connected to a slide member in the interior of the apparatus;
   said slide member adapted to move between a retracted position and a recording/reproducing position, said slide member constructed to receive said second holder when the cassette receiving means is in the closed position and move said second holder and cassette to the operative position.

2. An apparatus as in claim 1, wherein said apparatus includes a first side having said aperture and said slide member is movable substantially parallel to said first side.

3. An apparatus as in claim 1, wherein when said cassette receiving means is in the open position there is defined a gap between the casing of said apparatus and the cassette receiving means, and there is further provided concealing means for concealing said gap and preventing accidental insertion of a tape cassette into said gap, said concealing means operatively with said cassette tape receiving means to be movable from a storage position within said casing to an operative concealing position between said casing and said cassette receiving means by movement of the cassette receiving means from a closed to an open position.

4. An apparatus as in claim 3, wherein said concealing means is a plate.

5. An apparatus as in claim 4, wherein said plate is foldable for storage and is constructed to be folded when said cassette receiving means is in the closed position and the second holder means is in the intermediate position or operative position.

6. An apparatus as in claim 1, wherein said first axis and said second axis are substantially coaxial when the cassette receiving means is in the open position and said axes are spaced from each other in the recording/reproducing position.

7. An apparatus for recording and/or reproducing a signal on a magnetic tape in a cassette tape:

said apparatus having an outer casing which defines an aperture in a side thereof for use in loading and unloading a cassette into and from the apparatus through the aperture;

tape cassette receiving means for receiving and holding a cassette pivotally connected to said apparatus and constructed for movement through said aperture between a closed position and an open position;

said cassette receiving means including a first holder pivotally connected about a first axis to said apparatus and a second holder positioned within the first holder and constructed to hold a cassette which is pivotally connected about a second axis, with a slide member in the interior of the apparatus;

said slide member adapted to move between a holder receiving position and a recording/reproducing position, said slide member constructed to receive said second holder when the cassette receiving means is in the closed position and move said second holder and cassette to the operative position.

* * * * *